United States Patent [19]
Watanabe

[11] Patent Number: 5,697,864
[45] Date of Patent: Dec. 16, 1997

[54] SHIFT CONTROL APPARATUS FOR AN AUTOMATIC TRANSMISSION

[75] Inventor: Shinji Watanabe, Tokyo, Japan

[73] Assignee: Mitsubishi Denki Kabushiki Kaisha, Tokyo, Japan

[21] Appl. No.: 582,300

[22] Filed: Jan. 3, 1996

[30] Foreign Application Priority Data

Jan. 10, 1995 [JP] Japan ................ 7-001904

[51] Int. Cl.$^6$ ................ F16H 61/08
[52] U.S. Cl. ................ 477/98; 477/120; 477/124; 477/133; 475/123; 475/125; 475/129
[58] Field of Search ................ 475/117, 120, 475/121, 122, 123, 125, 128, 129; 477/98, 120, 124, 133, 146, 148

[56] References Cited

U.S. PATENT DOCUMENTS

| | | | |
|---|---|---|---|
| 4,367,528 | 1/1983 | Kawamoto | 475/129 X |
| 4,718,310 | 1/1988 | Shindo et al. | 475/128 X |
| 5,201,251 | 4/1993 | Kitagawa et al. | 475/117 X |
| 5,281,190 | 1/1994 | Koivunen | 475/125 X |
| 5,304,102 | 4/1994 | Narita et al. | 475/125 |
| 5,421,791 | 6/1995 | Futawatari | 475/117 |
| 5,425,284 | 6/1995 | Davis | 477/124 X |
| 5,454,763 | 10/1995 | Ikebuchi et al. | 475/128 |

FOREIGN PATENT DOCUMENTS

| | | | |
|---|---|---|---|
| 62-118145 | 5/1987 | Japan | 477/98 |
| 2-176254 | 7/1990 | Japan | 475/125 |

OTHER PUBLICATIONS

Toyota Crown New Model Car Maintenance Manual (Oct., 1991) Nissan SE-AT Maintenance Manual.

Primary Examiner—Charles A. Marmor
Assistant Examiner—Nathan O. Jensen
Attorney, Agent, or Firm—Sughrue, Mion, Zinn, Macpeak & Seas, PLLC

[57] ABSTRACT

A shift control apparatus for an automatic transmission includes a first transmission gear unit equipped with a clutch to clutch shift mechanism and a second transmission gear unit which is operatively connected in series with the first transmission gear unit and which is equipped with a clutch to one-way clutch shift mechanism. A clutch controller controls the clutch-to-clutch shift mechanism and the clutch to one-way clutch shift mechanism in such a manner that rotational synchronization of the clutch to one-way clutch shift mechanism is caused to take place earlier than or at the same time as rotational synchronization of the clutch to clutch shift mechanism when gear shifting is effected over the first and second transmission gear units.

12 Claims, 9 Drawing Sheets

FIG. 3

| ENGAGEMENT ELEMENT | SHIFT | | | | | |
|---|---|---|---|---|---|---|
| | 1ST SPEED | 2ND SPEED | 3RD SPEED | 4TH SPEED | 5TH SPEED | REVERSE DRIVE |
| B1 BRAKE | ○ | — | — | — | — | ○ |
| B2 BRAKE | — | ○ | — | — | ○ | — |
| B3 BRAKE | ○ | ○ | ○ | — | — | ○ |
| C1 CLUTCH | ○ | ○ | ○ | ○ | — | — |
| C2 CLUTCH | — | — | ○ | ○ | ○ | — |
| C3 CLUTCH | — | — | — | ○ | ○ | — |
| C4 CLUTCH | — | — | — | — | — | ○ |
| OWC | ○ | ○ | ○ | — | — | — |

SHIFT CONTROL APPARATUS FOR AN AUTOMATIC TRANSMISSION

BACKGROUND OF THE INVENTION

1. Field of the Invention

The present invention relates to a shift control apparatus for an automatic transmission, and more particularly to a shift control apparatus for an automatic transmission which is provided with first and second transmission units each capable of automatically switching a shift stage and where the first and second transmission units are operated concurrently or consecutively to achieve multi-stage shifting.

2. Description of Related Art

In recent years, multi-stage shift units have been adopted in a finite stage automatic transmission with the primary object of an improvement in fuel economy. A 4-speed automatic transmission is being used even in a light car and a 5-speed automatic transmission is being used in a high class automobile.

The 4-speed automatic transmission can achieve shift stages of 4 speeds with a first transmission unit alone, but it is general in the 5-speed transmission that first and second transmission units are connected in series to achieve shift stages of 5 speeds. In the case of the 5-speed automatic transmission, the skip shift of 2 stages or more is often performed between the first and second transmission units. The 5-speed automatic transmission shown in Toyota Crown New Model Car Maintenance Manual (October, 1991) is constructed so that a shift stage is switched with a one-way clutch to clutch shift mechanism. In this 5-speed automatic transmission, the skip shift of 2 stages or more is realized only with the oil pressure control of one of the oil pressure type frictional elements, because the switch timing of the clutch for changing speed is automatically performed by the one-way clutch.

However, in the conventional 5-speed automatic transmission the number of uses of the one-way clutch is increased because both first and second transmission units switch shift stages by the one-way clutch to clutch mechanism. Also, there is the need to arrange oil pressure type frictional elements in parallel with the one-way clutch so that engine brake braking occurs during deceleration. For this reason, the conventional automatic transmission is disadvantageous in the size and the weight increase of the transmission itself due to an increase in the number of parts to be used and the limitation on layout. In addition, since the conventional 5-speed automatic transmission has been designed for real-wheel drive, it is unsuitable for front-wheel drive where mounting requirements such as the size of a transmission main body are critical. Also, there is the problem that an increase in weight increases fuel consumption.

In contrast to this, as a 5-speed automatic transmission for front-wheel drive there has been proposed a 5-speed transmission where a first transmission unit using two gears and a second transmission unit using a single simple planetary gear are arranged on main and auxiliary shafts, respectively, and these first and second transmission units are connected in series to achieve shift stages of 5 speeds. In this transmission, the first transmission unit performs the switching of all of a shift stages by the clutch to clutch shift mechanism and the second transmission unit performs the switching of the shift stages by one-way clutch to clutch shift mechanism. Therefore, when, in a skip shift of 2 stages or more between the first and second transmission units, the clutch to clutch shift mechanism is caused to be first synchronized with rotation, the establishment of an intermediate shift stage cannot be avoided due to the clutch switching. Since high accuracy is required in the clutch switch timing and the oil pressure control in order to make the establishment period of the intermediate shift stage short, shift quality or response problem arises if the time required for changing speed is to long or the drive force does not change consecutively.

SUMMARY OF THE INVENTION

The present invention has been made in order to resolve the problems described above, and the object of the invention is to provide a shift control apparatus for an automatic transmission where, when the skip shift of 2 stages or more between first and second transmission units is performed, shift quality and shift response are compatible by changing the priority order of the synchronization of rotation for changing speed in accordance with a difference in a shift mechanism.

According to one aspect of the invention, there is provided a shift control apparatus for an automatic transmission, comprising: a first transmission gear unit having a clutch to clutch shift mechanism; a second transmission gear unit having a clutch to one-way clutch shift mechanism, the first and second transmission gear units being operatively connected in series with each other; and control means for controlling the clutch-to-clutch shift mechanism and the clutch to one-way clutch shift mechanism in such a manner that rotational synchronization of the clutch to one-way clutch shift mechanism is caused to take place earlier than or at the same time as rotational synchronization of the clutch to clutch shift mechanism when gear shifting is effected over the first and second transmission gear units.

In a preferred form of the invention, the clutch to clutch shift mechanism comprises a plurality of normal clutches for providing a plurality of gear shift stages, and the clutch to one-way clutch shift mechanism comprises at least one normal clutch and a one-way clutch, gear shifting being effected first between the normal clutch and the one-way clutch of the clutch to one-way clutch shift mechanism and then between the normal clutches of the clutch to clutch shift mechanism.

In another preferred form of the invention, the clutch to clutch shift mechanism and the clutch to one-way clutch shift mechanism includes a plurality of pairs of rotating frictional elements which are hydraulically engaged with or disengaged from each other. The control means includes electrically operated valve means for controlling hydraulic pressure applied to the frictional elements. The control means is adapted to be supplied with an electric control signal and convert it into a corresponding hydraulic pressure signal for operating the frictional elements.

With the above arrangements, when a shift stage between the first transmission gear unit and the second transmission gear unit is switched concurrently or consecutively, the hydraulic oil pressures for the rotating frictional elements are controlled by means of the electrically operated valve means so that the rotational synchronization of the clutch to one-way clutch shift mechanism occurs earlier than or at the same time as the rotational synchronization of the clutch to clutch shift mechanism. Accordingly, controllability is improved and a skip shift with quick response can be realized.

In a further preferred form of the invention, the shift control apparatus further comprises skip shift judgment means which determines that the gear shifting is a skip shift, when the following conditions are all satisfied:

a) an opening degree of a throttle valve in an intake pipe of an internal combustion engine is greater than a predetermined value;

b) a manipulation speed of the throttle valve is greater than a predetermined value; and c) a degree of surplus acceleration of the internal combustion engine is less than a predetermined value.

In a further preferred form of the invention, the frictional elements on engagement sides of the first and second transmission gear units are operated to perform their disengagement operations upon the skip shift judgment of the skip shift judgment means during the gear shifting.

In a further preferred form of the invention, the first transmission gear unit has an input shaft operatively connected with an internal combustion engine, and the control means sets disengagement hydraulic pressures for the frictional elements on the disengagement side of the first transmission gear unit based on a torque value of the input shaft and an inertia torque value of a rotating member of the input shaft.

In a further preferred form of the invention, the second transmission gear unit has an output shaft, and in setting of disengagement hydraulic pressures for the frictional elements on the disengagement side of the first transmission gear unit, completion of the rotational synchronization of the second transmission gear unit during gear shifting is judged on the basis of an apparent rotational speed of the input shaft of the first transmission gear unit upon the rotational synchronization of the first transmission gear unit, which is calculated by multiplying a rotational speed of the output shaft by a gear ratio of the second transmission gear unit after it has been shifted, and also on the basis of an actual rotational speed of the input shaft. Control signals for the electrically operated valve means are learned and corrected so that a rotational acceleration of the input shaft caused by the shifting of the first transmission gear unit immediately after the rotational synchronization of the second transmission gear unit corresponds to a previously set target value of the rotational speed of the input shaft.

In a further preferred form of the invention, the shift control apparatus further comprises timer means for timing a rotational synchronization hold time after completion of the rotational synchronization of the second transmission gear unit. In setting of disengagement hydraulic pressures for the frictional elements on disengagement side of the first transmission gear unit, the hydraulic pressures for the disengagement-side frictional elements of the first transmission gear unit are corrected in their pressure reducing direction and also the disengagement hydraulic pressure setting is learned and corrected when the rotational synchronization hold time from the timer means is greater than a predetermined time.

With this arrangement, the disengagement hydraulic oil pressure for the disengagement-side frictional elements of the first transmission gear unit is learned and controlled, at the time of the skip shift, to a hydraulic oil pressure in accordance with a load torque. Therefore, shift shock, which would otherwise be caused by engagement of the one-way clutch at the time of the rotational synchronization of the second transmission gear unit, is eliminated, thus providing good shift quality.

In a preferred form of the invention, the shift control apparatus further comprises a temperature sensor for sensing a temperature of hydraulic oil in the automatic transmission apparatus, and the control means corrects a disengagement instruction time for releasing the electrically operated valve means based on the sensed hydraulic oil temperature.

In a further preferred form of the invention, the disengagement hydraulic pressure set after the lapse of a disengagement instruction time for releasing the electrically operated valve means is corrected based on a rotational speed of an engine and an oil temperature of the transmission.

In a further preferred form of the invention, the one way-clutch is disposed in parallel with a brake.

In a further preferred form of the invention, the brake disposed in parallel with the one-way clutch is operated immediately after completion of the rotational synchronization of the second transmission gear unit carried out through the one-way clutch.

BRIEF DESCRIPTION OF THE DRAWINGS

The present invention will be described in further detail with reference to the accompanying drawings, in which:

FIG. 3 is a diagram showing the shift of the shift control apparatus of the automatic transmission shown in FIG. 2;

DESCRIPTION OF THE PREFERRED EMBODIMENT

A preferred embodiment of the present invention will hereinafter be described with reference to the accompanying drawings.

Figure 1:
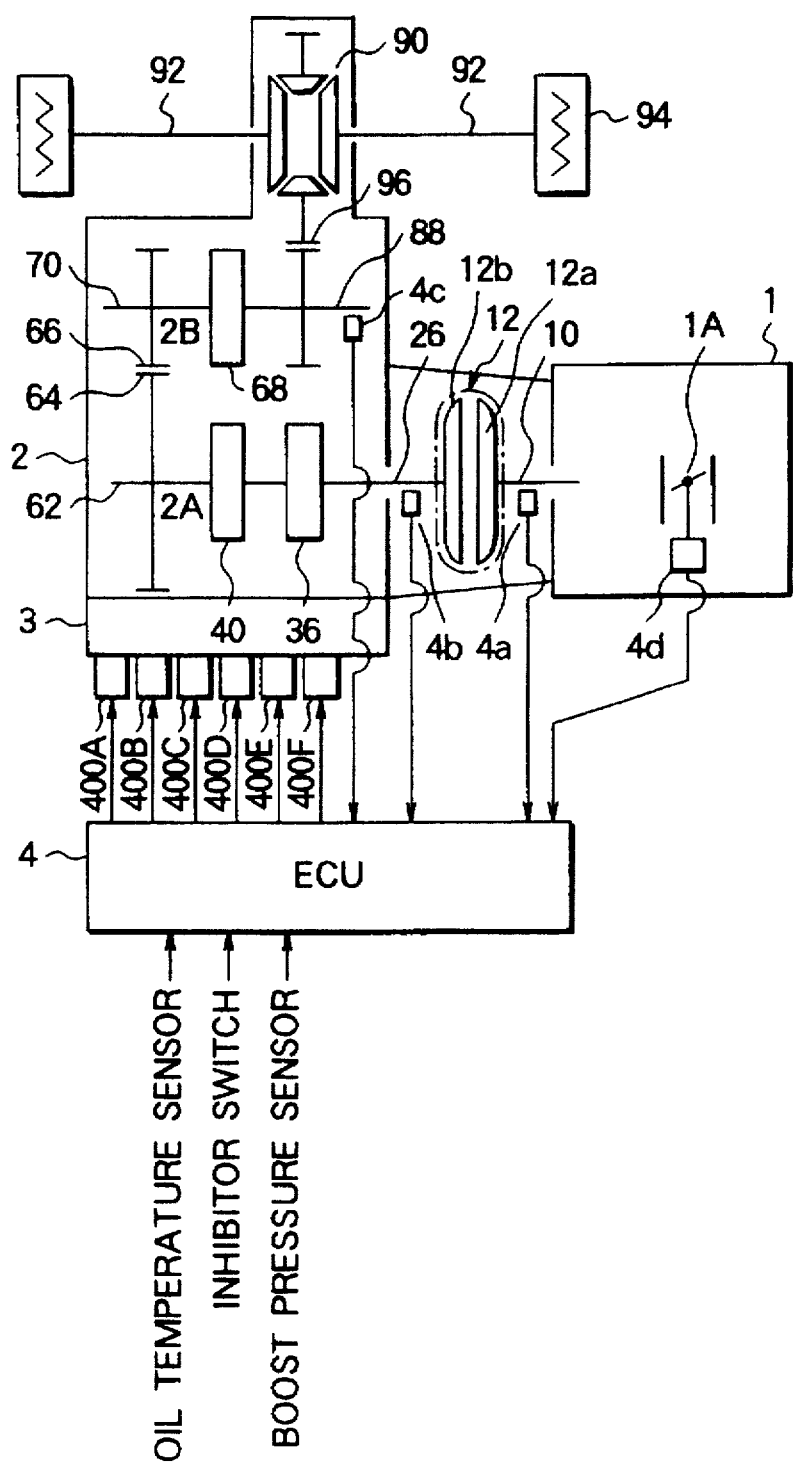
FIG. 1 is a block diagram showing a shift control apparatus for an automatic transmission constructed in accordance with an embodiment of the present invention.

FIG. 1 schematically illustrates the construction of the present invention. In this figure, an engine 1 has a crankshaft (not shown) which is coupled directly to a drive shaft 10, which is in turn coupled to a torque converter 12. Internal working oil in the torque converter 12 is caused to rotate by means of a pump 12a in the form of an input element of the torque converter 12. Drive force (increased torque) is input to an automatic transmission 2 by means of an output shaft 26 coupled to a turbine 12b in the form of an output element of the torque converter 12. The automatic transmission 2 comprises a first transmission gear unit 2A and a second transmission gear unit 2B. A control means in the form of an electronic control unit 4 (hereinafter referred to as an ECU) outputs control signals to electric oil pressure conversion valves (400A, 400B, 400C, 400D, 400E, 400F) provided on an oil pressure control unit 3. A desired switching shift stage is constituted by a working combination of an oil pressure type frictional element (28, 30, 32, 44, 54, 80, 82) shown in FIG. 2 and a planetary gear train (36, 40, 68) so that drive force corresponding to the traveling condition of a vehicle is transmitted from an output shaft 88 through a differential gear 90 and a drive axle 92 to drive wheels 94.

To the ECU 4 there is input an output signal of a throttle-opening sensor 4d for sensing an opening degree of a throttle valve 1A provided in an intake pipe (not shown) of the engine 1, an output signal of a rotational speed sensor 4a for sensing a rotational speed of the engine crankshaft, output signals of rotational speed sensors 4b and 4c for sensing rotational speed of the input and output shafts of the automatic transmission 2, an output signal of a temperature sensor (not shown) for sensing the temperature of hydraulic oil in the automatic transmission 2, an output signal of a boost pressure sensor (not shown) for detecting a pressure of an engine intake tube, and an output signal of an inhibitor switch (not shown) for sensing a switching position of a select lever (not shown) for the range switching of the automatic transmission 2. The ECU 4 detects the traveling condition of the vehicle, based on these output signals, and performs shift control so that the automatic transmission 2 is shifted to the shift stage corresponding to the detected vehicle's traveling condition.

Figure 2:
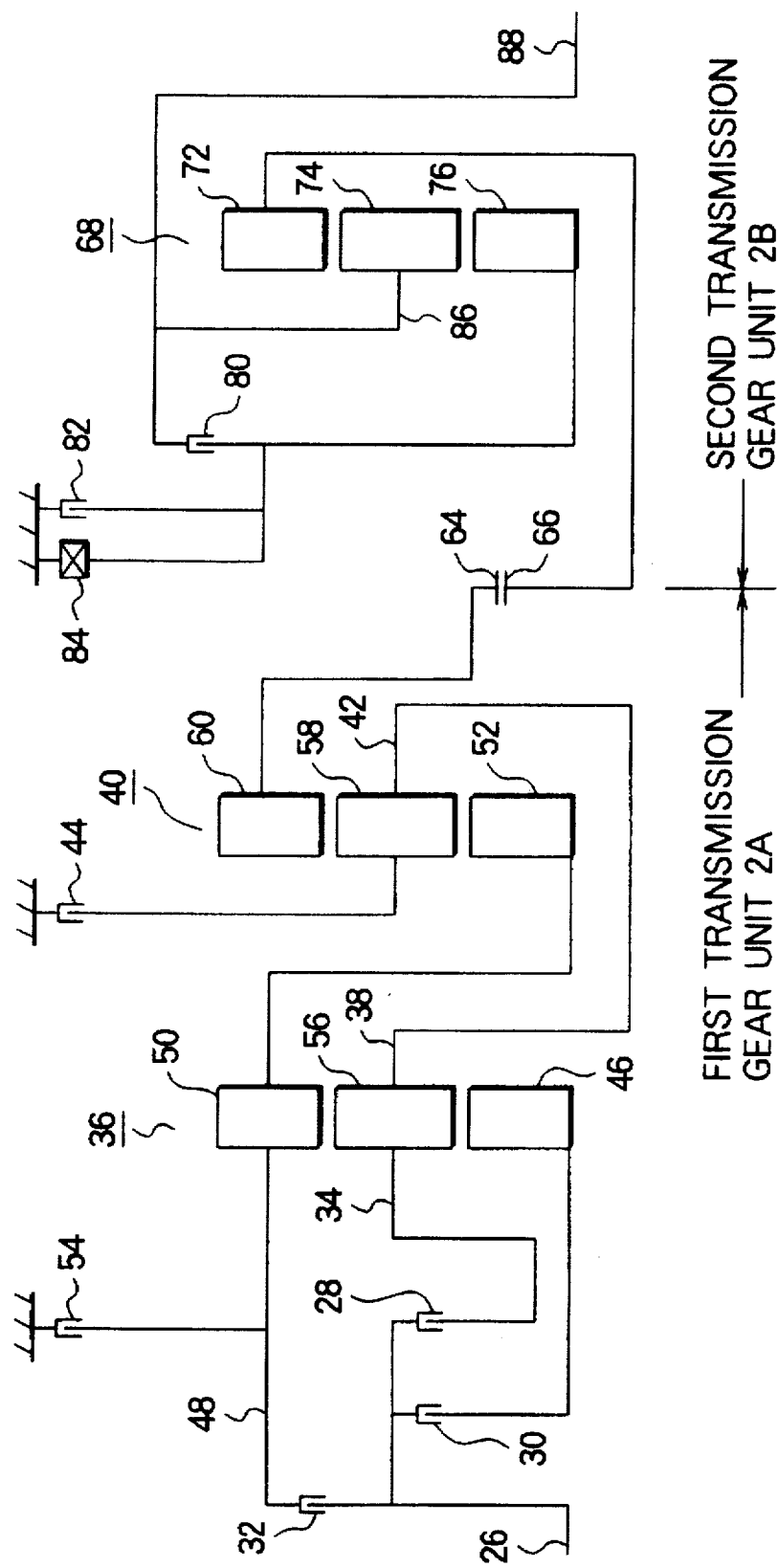
FIG. 2 is a schematic view showing the transmission drive of the automatic transmission where shift stages for 5 forward drive stages and for the reverse drive stage can be achieved according to the embodiment of the present invention.

FIG. 2 schematically illustrates the automatic transmission 2 where shift stages for 5 forward drive stages and for the reverse drive stage can be achieved. The drive shaft 10, coupled directly to the crankshaft of the engine 1 of FIG. 1, is coupled through the torque converter 12 to the input shaft 26 of the first transmission unit 2A of the automatic transmission 2 of FIG. 2.

The first transmission unit 2A is constituted by a first simple planetary gear train 36 (hereinafter referred to simply as a first gear train 36) and a second simple planetary gear train 40 (hereinafter referred to simply as a second gear train 40). The aforementioned second transmission unit 2B is constituted by a third simple planetary gear train 68 (hereinafter referred to simply as a third gear train 68).

The input shaft 26 of the first transmission unit 2A is coupled to a C1 clutch 30 in the form of a normal clutch and a C2 clutch 28 in the form of a normal clutch which operate as input clutches at the time of forward travel and to a C4 clutch 32 in the form of a normal clutch which operates as an input clutch at the time of reverse drive.

The output shaft of the C2 clutch 28 is coupled through a first intermediate shaft 34 to a first carrier 38 of the first gear train 36 and to a second carrier 42 of the second gear train 40, and is further coupled to a B1 brake 44 for stopping rotation of the first intermediate shaft 34.

The output side of the C1 clutch 30 is coupled to a first sun gear 46 of the first gear train 36.

The output side of the C4 clutch 32 is coupled through a second intermediate shaft 48 to a first ring gear 50 of the first gear train 36 and to a second sun gear 52 of the second gear train 40, and is further coupled to a B2 brake 54 for stopping rotation of the second intermediate shaft 48.

The first gear train 36 is constituted by the aforementioned first sun gear 46, a first pinion gear 56 meshing with the first sun gear 46, the aforementioned first carrier 38 freely rotatably supporting the first pinion gear 56 and rotatable on its own axis, and the aforementioned first ring gear 50 meshing with the first pinion gear 56.

The second gear train 40 is constituted by the aforementioned second sun gear 52, a second pinion gear 58 meshing with the second sun gear 52, the aforementioned second carrier 42 freely rotatably supporting the second pinion gear 58 and rotatable on its own axis, and a second ring gear 60 meshing with the second pinion gear 58. The second ring gear 60 is coupled to an output gear 64 of the first transmission unit 2A.

The output gear 64 of the first transmission unit 2A meshes with an input gear 66 of the second change gear unit 2B. The input gear 66 is coupled to a third ring gear 72 of the third gear train 68.

The third gear train 68 is constituted by a third sun gear 76, a third pinion gear 74 meshing with the third sun gear 76, a third carrier 86 freely rotatably supporting the third pinion gear 74 and rotatable on its own axis, and the aforementioned third ring gear 72 meshing with the third pinion gear 74.

The third sun gear 76 is coupled to a B3 brake 82 for stopping rotation of the third sun gear 76 and to a one-way clutch 84 (hereinafter referred to simply as an OWC). The third sun gear 76 is further coupled to a C3 clutch 80 in the form of a normal clutch so that the third carrier 86 and the third sun gear 76 are coupled by the engagement of the C3 clutch 80 and therefore the third gear train 68 is rotated as a unit body. Furthermore, the third carrier 86 is coupled through an output shaft 88 of the second transmission unit 2B to a final speed reduction gear 96 shown in FIG. 1.

The final speed reduction gear 96 of FIG. 1 transmits the drive force to the drive wheels 94 from the drive axle 92 through the differential gear 90.

Each of the aforementioned clutches and brakes is provided with a piston or servo unit for engagement so that an engage operation and a disengage operation are performed by supplying and discharging oil pressure. The oil pressure is selectively supplied to the clutches and brakes by means of an oil pressure control unit so that the shift stages for 5 forward drive stages and for the reverse drive stage are achieved by a working combination of the clutches and the brake.

FIG. 3 shows the working conditions of the clutch and brake in each shift stage. In FIG. 3, a "o" mark represents the engagement of the clutch or brake, and a "–" mark represents the disengagement of the clutch or brake.

Now, a description will be made of the achievement of the 1st speed.

If in the aforementioned construction the B1 brake 44 of the first transmission unit 2A engages the second carrier 42, then the first carrier 38 and the second carrier 42 will be fixed and become reactive force elements. As a result, the C1 clutch 30 engages the first sun gear 46, and the drive force is transmitted to the input gear 66 of the second transmission unit 2B through the input shaft 26, the C1 clutch 30, the first sun gear 46, the first pinion gear 56, the first ring gear 50, the second sun gear 52, the second pinion gear 58, the second ring gear 60, and the output gear 64 of the first transmission unit 2A from the torque converter 12. Furthermore, if the B3 brake 82 of the second transmission unit 2B engages the third sun gear 76, then the third sun gear 76 will be fixed and become a reactive force element. As a result, the drive force, transmitted to the input gear 66 of the second transmission unit 2B, is transmitted from the third ring gear 72 through the third pinion gear 74 and the third carrier 86 to the output shaft 88 of the second transmission unit 2B, and is further transmitted from the final speed reduction gear 96 through the differential gear 90 and the drive axle 92 to the drive wheels 94. In this way, the 1st speed is achieved.

Now, a description will be made of the achievement of the 2nd speed.

If the C1 clutch 30 of the first transmission unit 2A and the B3 brake 82 of the second transmission unit 2B remain in the engagement states, the B1 brake 44 is disengaged from the second carrier 42, and the B2 brake 54 is engaged with the first ring gear 50, then rotations of the first ring gear 50 and the second sun gear 52 will be stopped and become reactive force elements. As a result, the drive force is transmitted through the first sun gear 46, the first carrier gear 38, the second carrier 42, the second ring gear 60, and the output gear 64 of the first transmission unit 2A to the input gear 66 of the second transmission unit 2B. In this way, the 2nd speed is achieved.

Now, a description will be made of the achievement of the 3rd speed.

If the C1 clutch 30 of the first transmission unit 2A and the B3 brake 82 of the second transmission unit 2B remain in the engagement states, the B2 brake 54 is disengaged from the first ring gear 50, and the C2 clutch 28 is engaged with the first carrier gear 38, then the first gear train 36 will be integrally rotated as a whole because the first sun gear 46 and the first carrier gear 38 will be integrally rotated. Consequently, likewise the second gear train 40 is integrally rotated as a whole, and the 3rd speed where the input shaft 26 and the output gear 64 of the first transmission unit 2A have the same rotational speed is achieved.

Now, a description will be made of the achievement of the 4th speed.

If the C1 clutch 30 and the C2 clutch 28 of the first transmission unit 2A remain in the engagement states, the B3 brake 82 of the second transmission unit 2B is disengaged from the third sun gear 76, and the C3 clutch 80 of the second transmission unit 2B is engaged with the third carrier 86, then the third gear train 68 will be integrally rotated as a whole because the third sun gear 76 and the third carrier 86 of the second transmission unit 2B will be integrally rotated. Consequently, the 4th speed where the input shaft 26 of the first transmission unit 2A and the output shaft 88 of the second transmission unit 2B have the same rotational speed is achieved.

Now, a description will be made of the achievement of the 5th speed.

If the C2 clutch 28 of the first transmission unit 2A and the C3 clutch 80 of the second transmission unit 2B remain in the engagement states, the C1 clutch 30 of the first transmission unit 2A is disengaged from the first sun gear 46, and the B2 brake 54 of the first transmission unit 2A is engaged with the first ring gear 50, then rotation of the second sun gear 52 will be stopped and become a reactive force element. As a result, the drive force is transmitted from the input shaft 26 to the C2 clutch 28, the first intermediate shaft 34, the first carrier 38, the second carrier 42, the second pinion gear 58, the second ring gear 60, the output gear 64 of the first-transmission unit 2A, the input gear 66 of the second transmission unit 2B, and the third gear train 68. Consequently, there is achieved the 5th speed of overdrive where the rotation of the output shaft 88 of the second transmission unit 2B is faster than the rotation of the input shaft 26 of the first transmission unit 2A.

Now, a description will be made of the achievement of the reverse drive.

If the C2 clutch 28 and the B2 brake 54 of the first transmission unit 2A are disengaged from the first and second intermediate shafts 34 and 48 and the B1 brake 44 of the first transmission unit 2A is engaged with the second carrier 42, then the first carrier 38 and the second carrier 42 will be fixed and become reactive force elements. With the engagement between the input shaft 26 and the C4 clutch 32, the drive force is transmitted through the second intermediate shaft 48, the first ring gear 50, the second sun gear 52, the second pinion gear 58, the second ring gear 60, and the output gear 64 of the first transmission unit 2A to the input gear 66 of the second transmission unit 2B. If the C3 clutch 80 of the second transmission unit 2B is disengaged from the third pinion gear 74 and the B3 brake 82 of the second transmission unit 2B engages with the third sun gear 76, then the third sun gear 76 will be fixed and become a reactive force element. As a result, the drive force, transmitted to the input gear 66 of the second transmission unit 2B, is transmitted through the third ring gear 72, the third pinion gear 74, and the third carrier 86 to the output shaft 88 of the second transmission unit 2B. In this way, the shift stage of the reverse drive is achieved.

Figure 4:
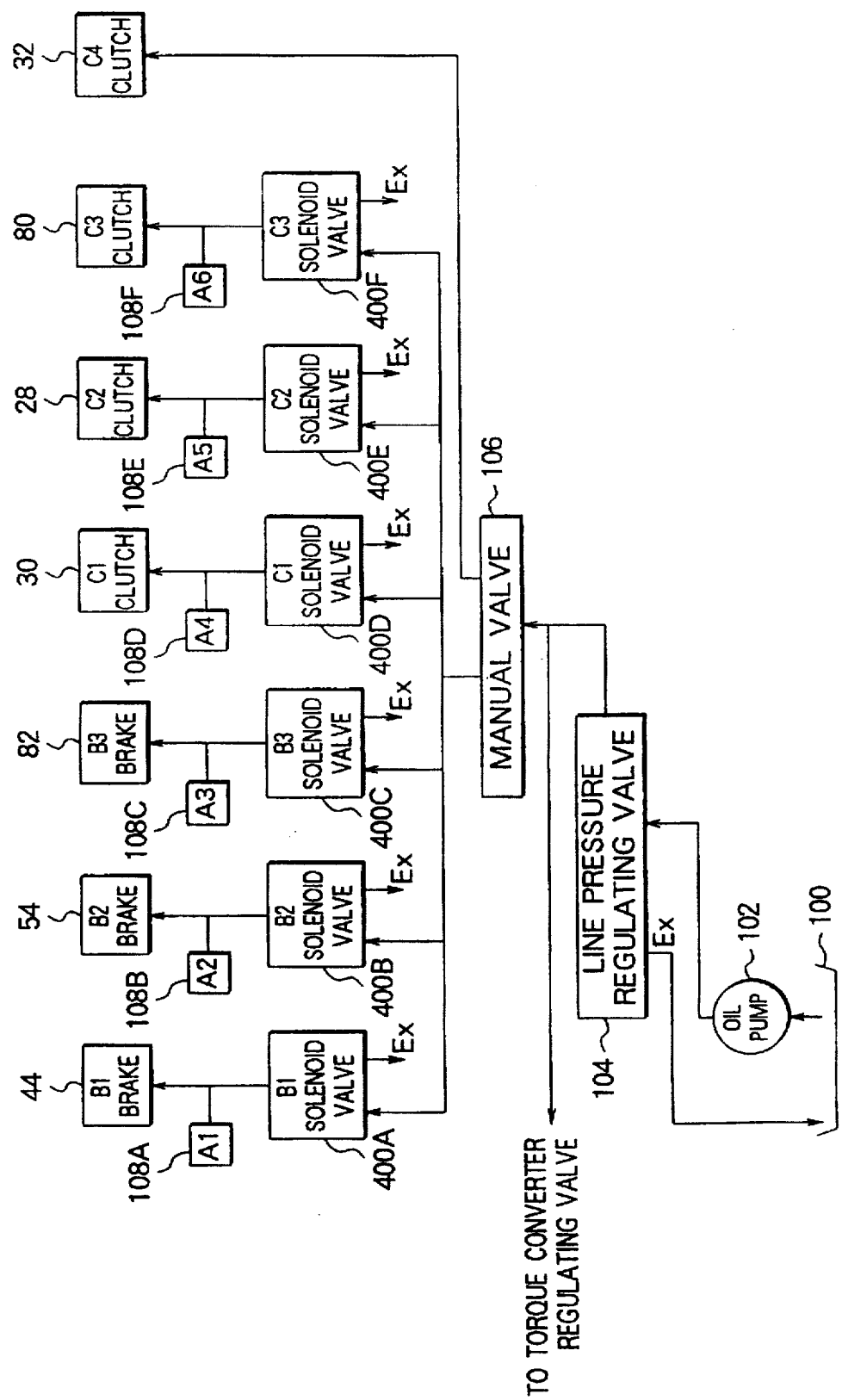
FIG. 4 is a block diagram showing the oil pressure circuit of the shift control apparatus of the automatic transmission constructed in accordance with the embodiment of the present invention.

Now, a description will be made of the constitution and operation of the oil pressure control unit 3 which, in the transmission shown in FIG. 2, achieves each shift stage shown in FIG. 3. FIG. 4 shows the constitution of the oil pressure control unit 3 which is arranged above the engine crankshaft 10 (FIG. 1). The oil pressure, generated by an oil pump 102 driven by the engine, is regulated to a constant pressure as a line pressure by means of a line pressure regulating valve 104. Reference numeral 100 denotes an oil pan.

The regulated line pressure is supplied to a manual valve 106 which is coupled directly to and operated by a shift lever (not shown). Oil paths are selectively switched according to the position of the shift lever so that the supply of oil pressure to the C1 to C4 clutches 30, 28, 80, and 32 and the B1 to B3 brakes 44, 54, and 82, which perform an engage operation at the time of forward drive and reverse drive, is performed via solenoid valves 400A to 400F or directly. Also, the regulated line pressure is supplied to a torque converter control valve (not shown) through a pressure regulating valve (not shown) for the torque converter 12. The torque converter control valve is indirectly controlled by a lock-up solenoid valve (not shown) so that the oil pressure of a lock-up clutch (not shown) is controlled and the engage-disengage operation is performed.

The constitution and operation of each of the solenoid valves for oil pressure control is known in "Characteristic Analysis of Duty Control Solenoid Valve for Electric Hydraulic Conversion" (Automobile Technology Society Journal, 1988, Vol. 42, No. 4, pp. 517–523), and the oil pressure control of each of the solenoid valves 400A to 400F is performed by controlling the duty of each of the valves at the time of the engage or disengage operation of each of the clutches and the brakes. The solenoid valves 400A to 400F of this embodiment are normally closed three-way valves, and each valve is provided with a solenoid coil, a valve body, and a spring urging the valve body in its closing direction. In the non-excitation state (OFF) of the aforementioned solenoid coil, the aforementioned valve body closes the oil supply path of the valve and opens the oil discharge path of the valve so that the oil pressure is discharged from the valve. In the excitation state (ON) of the aforementioned solenoid coil, the aforementioned valve body opens the oil supply path of the valve and closes the oil discharge path of the valve so that the oil pressure is supplied to the clutch or brake.

With the aforementioned solenoid valves, the oil pressures of the clutches and brakes are controlled when one shift stage is shifted to another shift stage. For example, when the power-on upshift from the 1st speed to the 2nd speed is performed, the B2 brake 54 is increased in oil pressure and engaged by means of the B2 solenoid valve 400B and at the same time the B1 brake 44 is decreased in oil pressure and disengaged according to the rise in the oil pressure of the B2 brake 54 by means of the B1 solenoid valve. Also, accumulators 108A to 108F are arranged on the paths between the solenoid valves and the brakes or clutches, respectively. Each of the accumulators 108A to 108F is generally known in prior art and comprises a piston and a spring. The main purposes of the accumulators are to suppress the pulsation in the oil pressure which occurs as the oil pressure control is performed by the duty solenoid valves.

Figure 5:
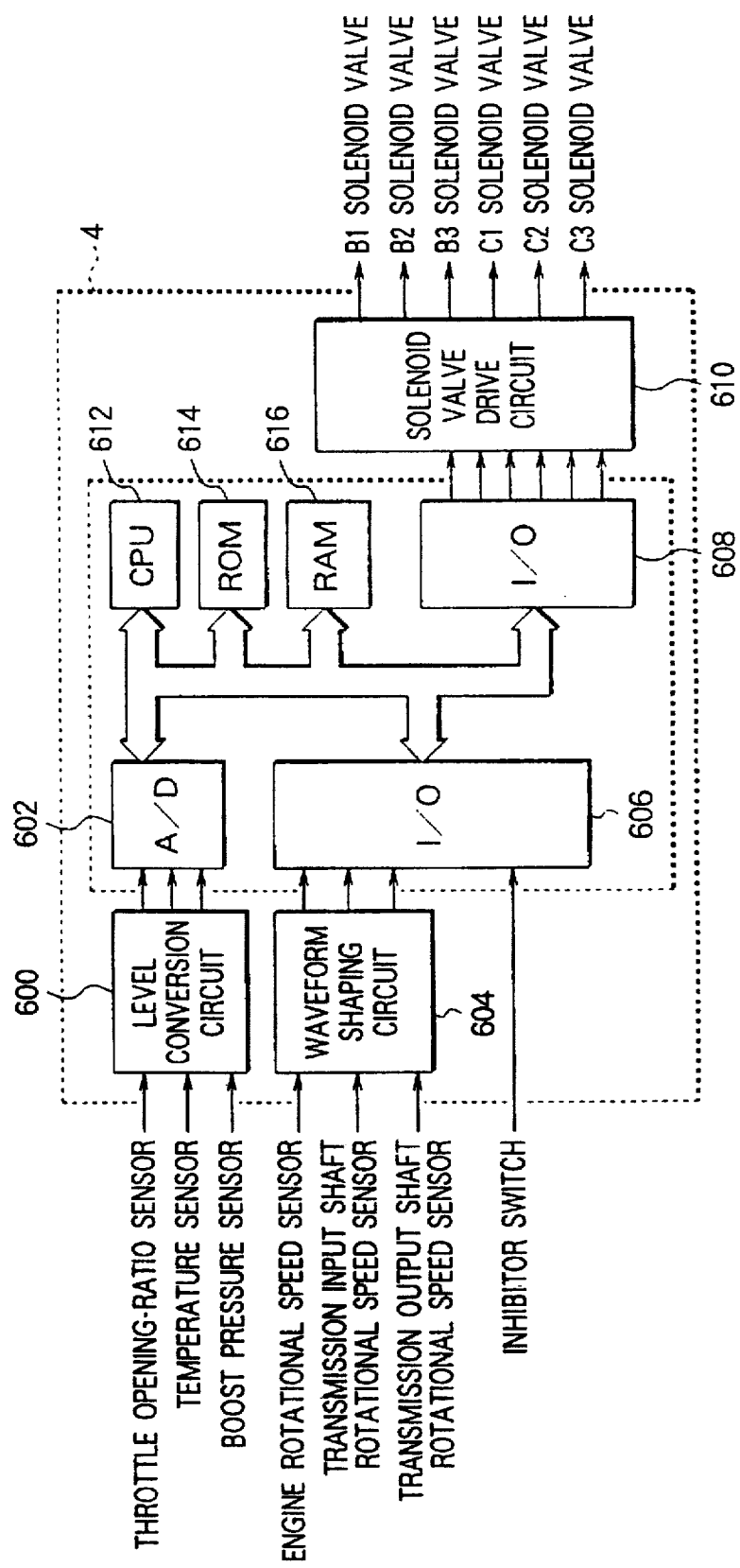
FIG. 5 is a block diagram showing an electronic control unit of the embodiment of the present invention.

FIG. 5 shows the internal construction of the ECU 4. The ECU 4 controls the automatic transmission 2 so that a shift stage is obtained according to the traveling state of the vehicle, based on the analog signals of the sensors such as the throttle opening-ratio sensor 4d obtained through a level conversion circuit 600 and an ND converter 602, the pulse signals of the rotational speed sensors 4b, 4c obtained through a waveform shaping circuit 604, and the switch signal of the inhibitor switch obtained through an I/O port 606. For this reason, the ECU 4 processes various kinds of signals and outputs the processing results to a solenoid valve drive circuit 610 from an I/O port 608. Then, the shift control, where the clutches and the brakes are engaged and disengaged, is performed, for example, by duty driving the solenoid valves of the clutches and the brakes in accordance with the aforementioned shift stage. The control procedure and data for a CPU 612 are stored in an ROM 614 in advance, and an RAM 616 temporarily stores the data in the calculation process.

Now, the shift operation will be described with respect to an example of the downshift (skip shift) from the 5th speed to the 2nd speed. In the state of the 5th speed, the B2 brake 54 and the C2 clutch 28 of the first transmission gear unit 2A and the C3 clutch 80 of the second transmission gear unit 2B have been in the engaged states. In the 5-2 skip shift which is performed by pushing the accelerator pedal down, from this state the C1 clutch 30 of the first transmission gear unit 2A is engaged while disengaging the C2 clutch 28, and the B3 brake 82 of the second transmission gear unit 2B is engaged while disengaging the C3 clutch 80. In this way, the switching of the frictional elements is smoothly performed. In order to achieve the 2nd speed while suppressing and minimizing the output shaft torque variation, the oil pressures of the C1 clutch 30, the C2 clutch 28, the C3 clutch 80 and the B3 brake 82 are finely controlled by duty controlling the C1 solenoid valve 400D, the C2 solenoid valve 400E, the C3 solenoid valve 400F and the B3 solenoid valve 400C.

This shift between the first transmission gear unit 2A and the second transmission gear unit 2B is performed consecutively or concurrently. In the first transmission gear unit 2A, the switching from the C2 clutch 28, which is a clutch for an input shaft, to the C1 clutch 30 is performed by the clutch to clutch shift. Also, in the second transmission gear unit 2B, the switching from the C3 clutch 80 to the OWC 84 (engagement of the B3 brake after the engagement of the OWC 84) is performed by the clutch-to-OWC shift. In the case of the clutch-to-OWC shift, the control of the timing and the torque allotted amount of the OWC 84 is unnecessary when the OWC 84 is switched because the disengaging and engaging operations of the OWC 84 are automatically performed by the engaging and disengaging operations on the clutch side. On the other hand, in the case of the clutch to clutch shift, the switching of the clutch needs to be performed by controlling the clutch switching timing and the torque allotted amount in accordance with the transfer of the drive force. If the clutch switching timing or the torque allotted amount is in error, the shift quality or the shift response will be greatly damaged because the shift will induce an interlocked state or the abrupt boosting (blow-up) of the engine when the clutch is switched.

The operation of the embodiment of the present invention will hereinafter be described according to a control flowchart.

Figure 6:
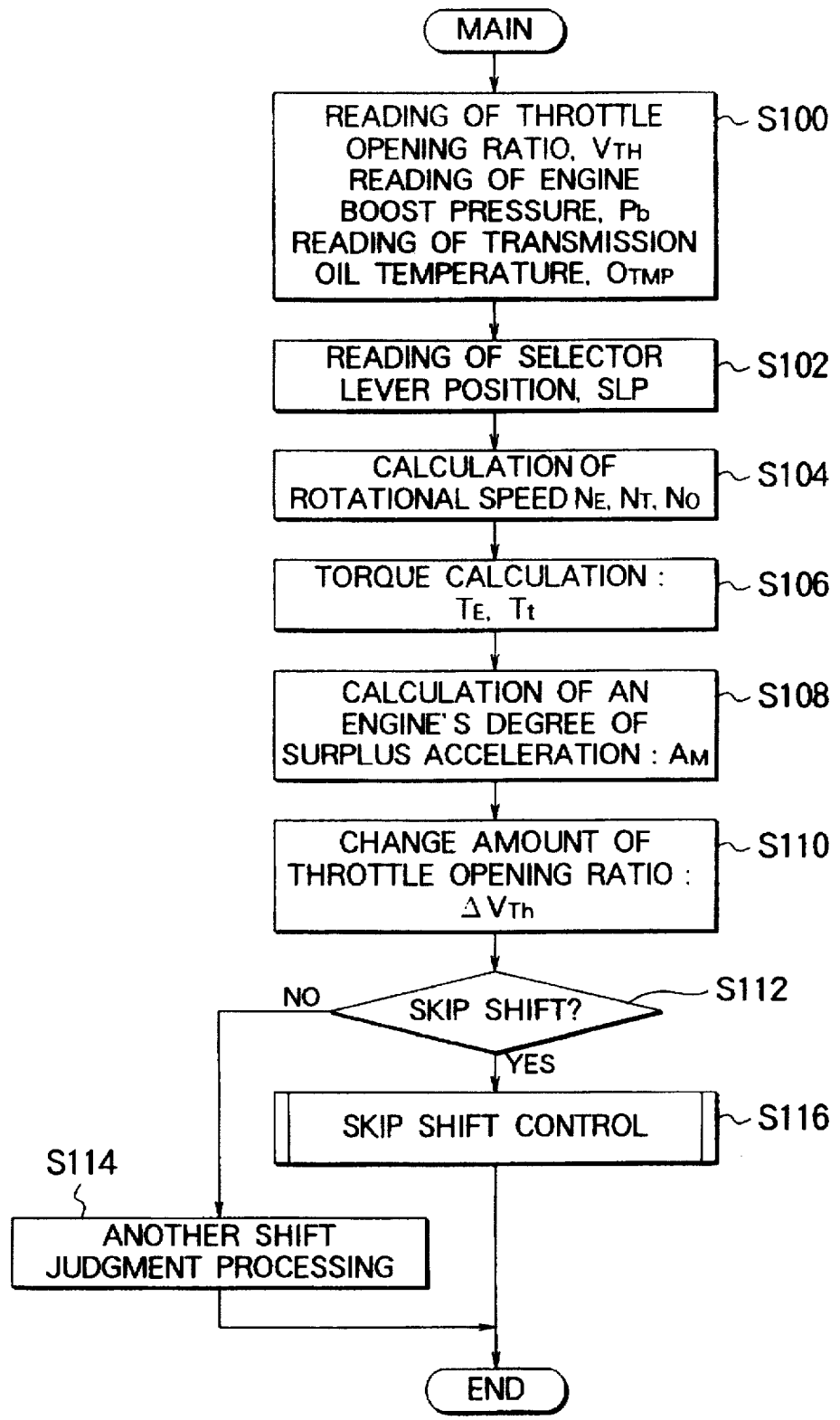
FIG. 6 is a flowchart showing the main flow of the embodiment of the present invention.

FIG. 6 shows a main flowchart. In step S100, a throttle opening $V_{Th}$ sensed by the throttle sensor 4d, a speed change gear oil temperature $O_{TMP}$ sensed by the temperature sensor (not shown) provided in the oil pressure control unit 3 of the automatic transmission 2, and an engine boost pressure $P_b$ sensed by the pressure sensor (not shown) provided in the intake pipe of the engine 1 are read in.

In step S102 a shift selector lever position SLP is read in from the inhibitor switch (not shown).

In step S104 an engine rotational speed $N_E$, a transmission input shaft rotational speed $N_t$ (hereinafter referred to as a turbine rotational speed $N_t$), and a transmission output shaft rotational speed $N_O$ (corresponding to a vehicle speed) are calculated.

In step S106 an engine torque $T_E$ is calculated from a previously set engine torque map 300 stored in and read from the RAM 616 by the engine boost pressure $P_b$ and the engine rotational speed $N_e$. A pump torque $T_p$ is calculated from the engine torque $T_E$ and an engine inertia torque $(I_e \cdot dN_E)$ calculated from an engine inertia $I_e$ and an engine rotational acceleration $dN_E$. A turbine torque $T_t$ is calculated by multiplying the pump torque $T_p$ by a torque-converter torque ratio $t_r$ (calculated from a torque-converter torque ratio $t_r$ map 302 by the torque-converter speed ratio e).

In step S108 a surplus acceleration $A_M$ of the engine is calculated by the following equation.

$$A_M = (T_{EMAX} - T_E + T_{EACC})/T_{EMAX} \qquad (1)$$

where $T_{EMAX}$ represents the maximum engine torque and $T_{EACC}$ represents the engine acceleration torque. The maximum engine torque $T_{EMAX}$ is calculated from the engine torque map 300 by the engine rotational speed $N_E$ in the current traveling state and the engine maximum boost pressure $P_{bmax}$ in the fully open state of the throttle valve 1A. The engine acceleration torque $T_{EACC}$ is calculated by the following equation.

$$T_{EACC} = R_A \cdot r/(iT \cdot iF \cdot \eta \cdot t_r) \qquad (2)$$

where $R_A$ represents the acceleration resistance; r represents the tire diameter; iT represents the current gear ratio; iF represents the final gear reduction ratio; $\eta$ represents the transfer efficiency of the transmission; and $t_r$ represents the torque ratio of the torque converter. The torque-converter torque ratio $t_r$ is calculated from the torque-converter torque ratio map 302 by the torque converter speed ratio e, which is calculated from the engine rotational speed $N_E$ and the turbine rotational speed $N_t$. The acceleration resistance $R_A$ is calculated by the following equation.

$$R_A = \{(W + WO \cdot (K_{MT} + K_{ME} \cdot iT^2 \cdot iF^2)\} \cdot GX \qquad (3)$$

where W represents the vehicle weight; WO represents the vacant vehicle weight; $K_{MT}$ represents the weight ratio equivalent to the tire rotating member; $K_{ME}$ represents the weight ratio equivalent to the engine rotating member; and GX represents the longitudinal acceleration. The longitudinal acceleration GX is calculated from the differentiated value of the transmission output shaft rotational speed $N_O$.

In step S110 the change amount of the throttle opening $\Delta V_{Th}$, is calculated from the difference between the present reading value and the previous reading value.

In step S112 whether the kick downshift, performed by pushing the accelerator pedal down in the traveling state of the 4th or 5th speed, is a skip shift or not is judged. For example, if the throttle opening $V_{Th}$ is greater than a predetermined value $V_{Thr}$ and if the throttle opening change amount $\Delta V_{Th}$ is greater than a predetermined value $\eta V_{Thr}$, and if the engine's degree of surplus acceleration $A_M$ is less than a predetermined value $A_{Mr}$, then it will be judged that the kick downshift is a skip shift, and step S112 will advance to step S116 in which skip shift control is performed. If NO, step S112 will advance to step S114. In step S114, shift judgment processing other than the skip shift is performed.

Now, the skip shift control operation in step S116 will be described according to a flowchart shown in FIG. 7, a block diagram for setting a control parameter $D_R$ of the oil pressure of the C2 brake shown in FIG. 8, and time charts for the 5-2 skip shift shown in FIGS. 9(a) to 9(g).

FIG. 9(a) shows a signal indicative of rising or start of the throttle opening $V_{Th}$; FIG. 9(b) the rotational speed characteristic; FIG. 9(c) the control signal of the B3 solenoid valve 400C; FIG. 9(d) the operating-state characteristic of the one-way clutch; FIG. 9(e) the control signal of the C3 solenoid valve 400F; FIG. 9(f) the control signal of the C2 solenoid valve 400E; and FIG. 9(g) the control signal of the C1 solenoid valve 400D.

A description will be made of, for example, the skip shift from the 5th speed to the 2nd speed.

Figure 7:
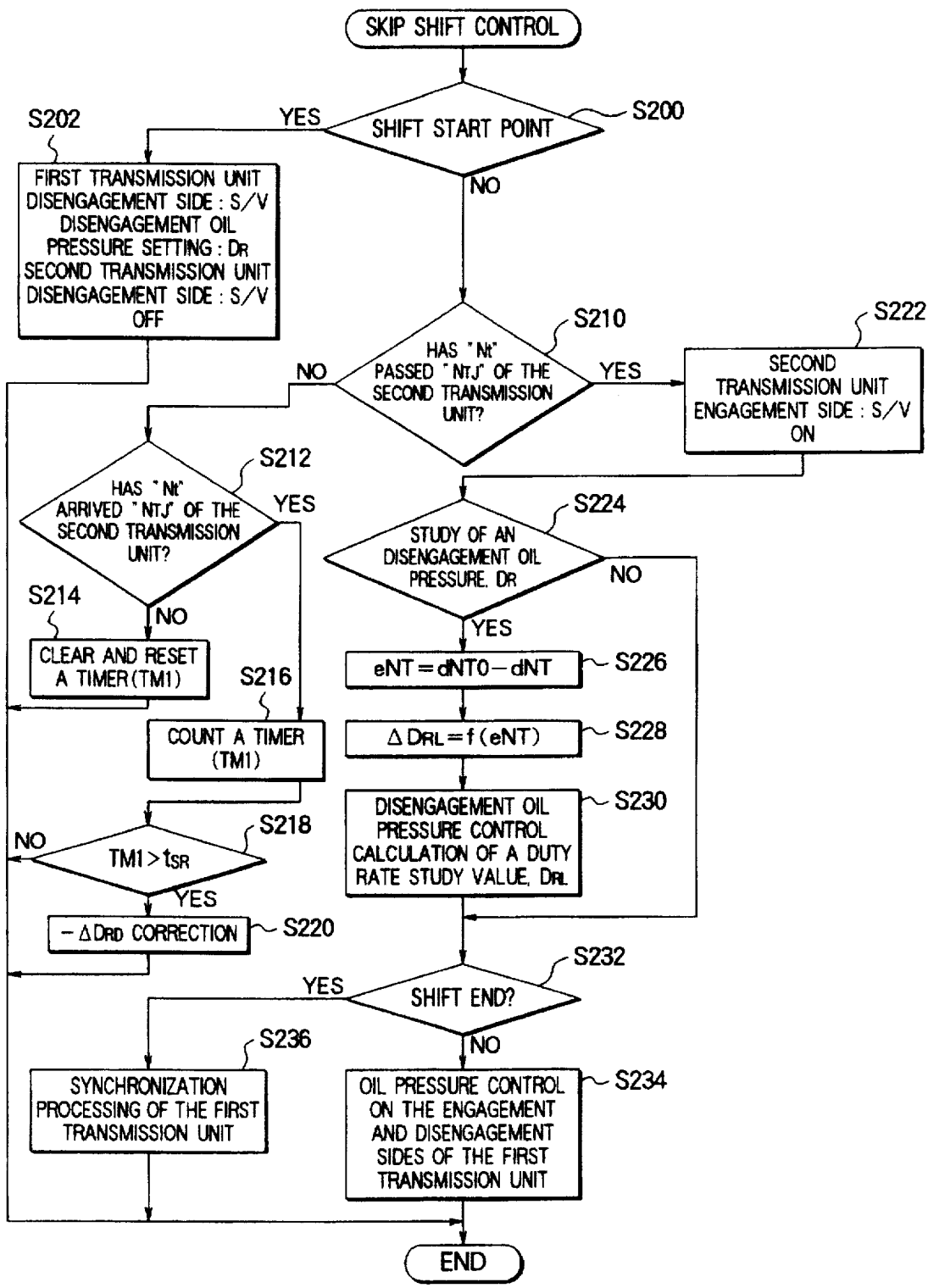
FIG. 7 is a flowchart showing the 5-2 skip shift execution flow of the embodiment of the present invention.

As shown in FIG. 7, in step S200, whether the shift selector lever position SLP read in step 102 of FIG. 6 is at a shift start point (S, S) or not is judged. If the selector lever position SLP is at the shift start point, step S200 will advance to step S202. In step S202 the disengagement oil pressure setting for disengagement of the C2 clutch of the first transmission gear unit 2A is carried out with the control duty ratio $D_R$ of the C2 solenoid valve 400E. This control duty ratio $D_R$ is calculated as follows. As shown in the parameter setting block diagram of FIG. 8, a turbine rotational acceleration target value $dN_{TO}$ is calculated from the transmission output shaft rotational speed $N_O$ using the following formula.

$$dN_{TO}=a \cdot N_O+b$$

where a and b are constants that are set at every interval of a shift stage. An inertia torque $(I_x \cdot dN_{TO})$, needed at the time of a downshift, is calculated from the turbine rotational acceleration target value $dN_{TO}$ and the inertia torque $I_x$ of the transmission input shaft rotating member. A torque $T_{SFT}$ is obtained by subtracting the calculated inertia torque $(I_x \cdot dN_{TO})$ from the turbine torque $T_t$ calculated in step S106. A disengagement oil pressure control duty ratio base value $D_{RO}$, read from a disengagement oil pressure control duty ratio base value $D_{RO}$ map 308 previously set in correspondence with the obtained torque $T_{SFT}$, and a disengagement oil pressure control duty ratio learning value $D_{RL}$ are added. Then, the duty ratio added value $(D_{RO}+D_{RL})$ is multiplied by a correction coefficient $K_E$ read from an engine rotational speed correction coefficient $K_E$ map 310 previously set in correspondence with the engine rotational speed $N_E$. Furthermore, a duty correction amount $\Delta D_T$, read from an oil temperature correction amount $\Delta D_T$ map 312 of the duty ratio previously set in correspondence with the oil temperature $O_{TMP}$, is added to the multiplied value $(K_E(D_{RO}+D_{RL}))$. This added value is output to the C2 solenoid valve 400E as a disengagement oil pressure control duty ratio $D_R$, as shown in the time charts of FIG. 9. Then, the control signal of the oil pressure control C3 solenoid valve 400F on the disengagement side of the second transmission gear unit 2B is caused to go to its OFF state, and the C2 clutch 28 and the C3 clutch 80 are caused to go to the disengaged state. In this way, the processing is ended.

On the other hand, if in step S200 the selector lever position SLP is not at the shift start point, step S200 will advance to step S210. In step S210, for the rotational synchronization of the shift of the second transmission gear unit 2B, the aforementioned turbine rotational speed $N_t$ is compared with an apparent or estimated synchronization turbine rotational speed $N_{TJ}$ (=$N_O \cdot i_{TJ}$) of the second transmission gear unit 2B calculated from the transmission output shaft rotational speed $N_O$ and a shift ratio $i_{TJ}$ of the second transmission gear unit 2B. If the aforementioned turbine rotational speed $N_t$ has not passed the apparent synchronization rotational speed $N_{TJ}$ of the second transmission gear unit 2B, step S210 will advance to step S212. On the other hand, if the turbine rotational speed has passed the apparent synchronization rotational speed, step S210 will advance to step S222.

In step S212 whether the aforementioned turbine rotational speed $N_t$ has reached the apparent synchronization turbine rotational speed $N_{TJ}$ is judged. If NO, step S212 will advance to step S214. In step S214 a timer TM1 for timing a rotational synchronization hold time is cleared and the processing is ended. If YES, step S212 will advance to step S216. In step S216 the timer TM1 is counted up, and step S216 advances to step S218. In step S218 whether the timer TM1 is greater than a predetermined time $t_{SR}$ is judged. If YES, step S218 will advance to step S220. In step S220, as shown in the time charts of FIG. 9, a predetermined duty ratio $\Delta D_{RD}$ is subtracted at intervals of a control cycle (for example, 20 ms) until the aforementioned turbine rotational speed $N_t$ becomes greater than the apparent synchronization rotational speed $N_{TJ}$ of the second transmission gear unit 2B, and the disengagement oil pressure control duty ratio is learned and corrected by a predetermined value $(-\Delta D_{RL})$, while reducing the disengagement pressure of the C2 clutch 28. On the other hand, if the timer TM1 has not reached the predetermined time $t_{SR}$, the processing will be ended.

In step S222 the OWC 84 is caused to go to the locked state by the rotational synchronization of the second transmission gear unit 2B. Therefore, the B3 brake 82 is also caused to go to the engaged state by turning on the B3 solenoid valve of the B3 brake 82 arranged in parallel with the OWC 84, and step S222 advances to step S224.

In step S224 the learning judgment of the disengagement oil pressure control duty ratio $D_R$ of the second transmission gear unit 2B is affected by determining whether the aforementioned turbine rotational speed $N_t$ has passed the aforementioned predetermined time $t_{SR}$ after $N_t$ reaches the apparent synchronization rotational speed $N_{TJ}$ of the second transmission gear unit 2B. If NO, step S224 will advance to step S232. If YES, step S224 will advance to step S226. In step S226, the learning of the disengagement oil pressure control duty ratio $D_R$ of the second transmission gear unit 2B is carried out.

In step S226 a turbine rotational acceleration $dN_T(N_{tJ2}-N_{tJ1})$ is calculated from the differential value between the rotational speed $N_{tJ1}$ at the time the aforementioned turbine rotational speed $N_t$ has reached the apparent synchronization rotational speed $N_{TJ}$ of the second transmission gear unit 2B and the rotational speed $N_{t/2}$ at the time the aforementioned predetermined time $t_{SR}$ has passed after $N_t$ reaches $N_{TJ}$. Then, a deviation $e_{NT}$ between the turbine rotational acceleration and a turbine rotational acceleration target value $dN_{TO}$ calculated from the aforementioned transmission output shaft rotational speed $N_O$ is calculated, and step 226 advances to step S228.

Figure 8:
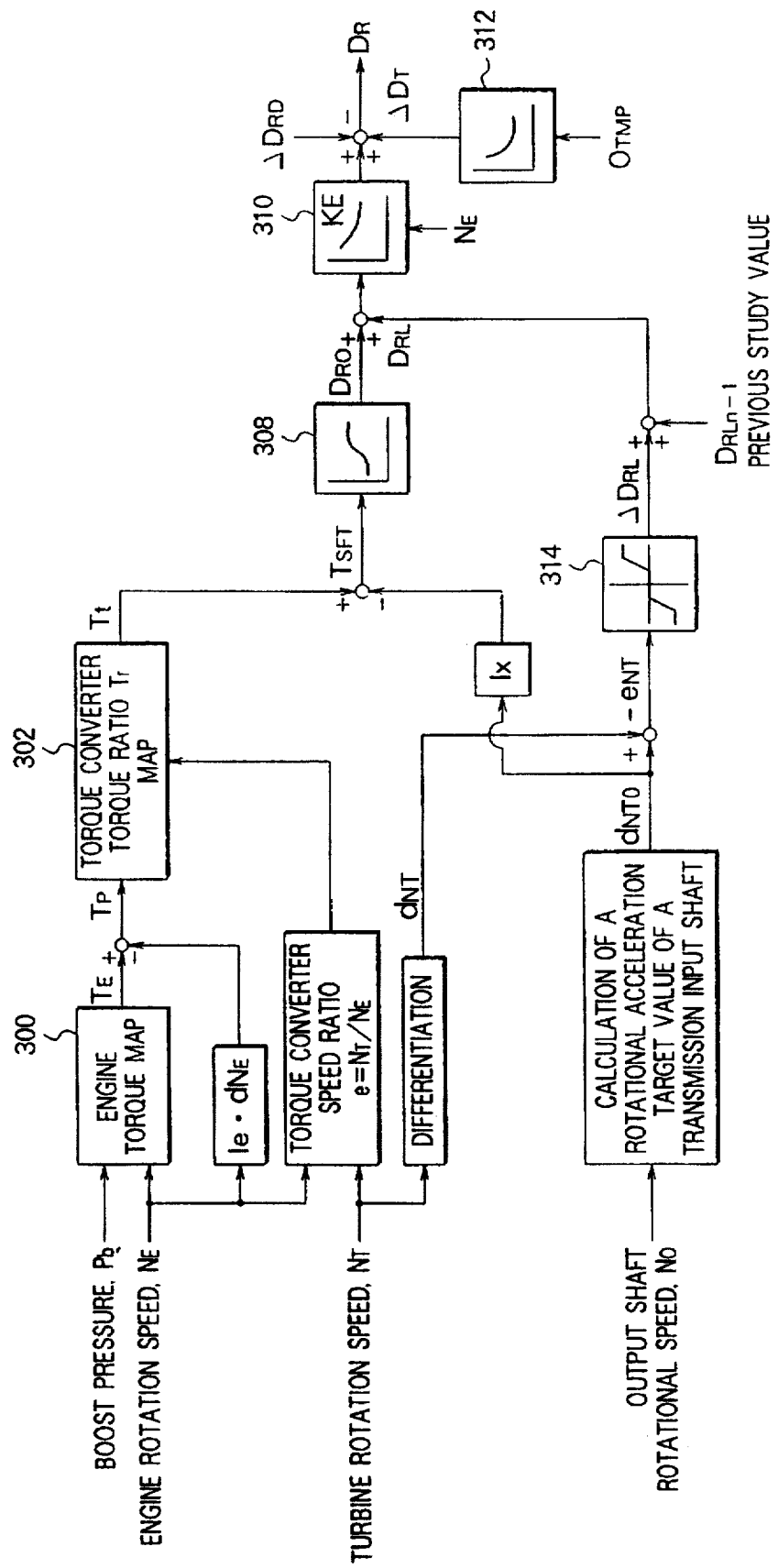
FIG. 8 is a block diagram showing how control parameters are set when the 5-2 skip shift of the embodiment of the present invention is executed.

In step S228 a learning correction amount $\Delta D_{RL}$ is calculated according to the aforementioned deviation $e_{NT}$ from a disengagement oil pressure control duty ratio learning correction amount $\Delta D_{RL}$ map 314 shown in FIG. 8, and step S228 advances to step S230.

In step S230 the aforementioned learning correction amount $\Delta D_{RL}$ is added to the learning value $D_{RLn-1}$ of the previous skip shift to calculate a learning value $D_{RL}$ of the disengagement oil pressure control duty ratio for the next skip shift.

In step S232 the finishing or completion of the 5-2 skip shift is judged from the rotational synchronization of the first transmission gear unit 2A, and the aforementioned turbine rotational speed $N_t$ is compared with an apparent synchronization turbine rotational speed $N_{Tk}(=N_O \cdot i_{Tk})$ of the second speed shift stage calculated from the aforementioned transmission output shaft rotational speed $N_O$ and the shift ratio $i_{Tk}$ of the second speed shift stage. If the aforementioned turbine rotational speed $N_t$ has not reached the apparent synchronization rotational speed $N_{Tk}$ of the second speed shift stage, step S232 will advance to step S234. If $N_t$ has reached $N_{Tk}$, step S232 will advance to step S236. In step S236 the rotational synchronization processing of the first transmission gear unit 2A, such as the setting of various kinds of flags, is performed.

Figure 9:
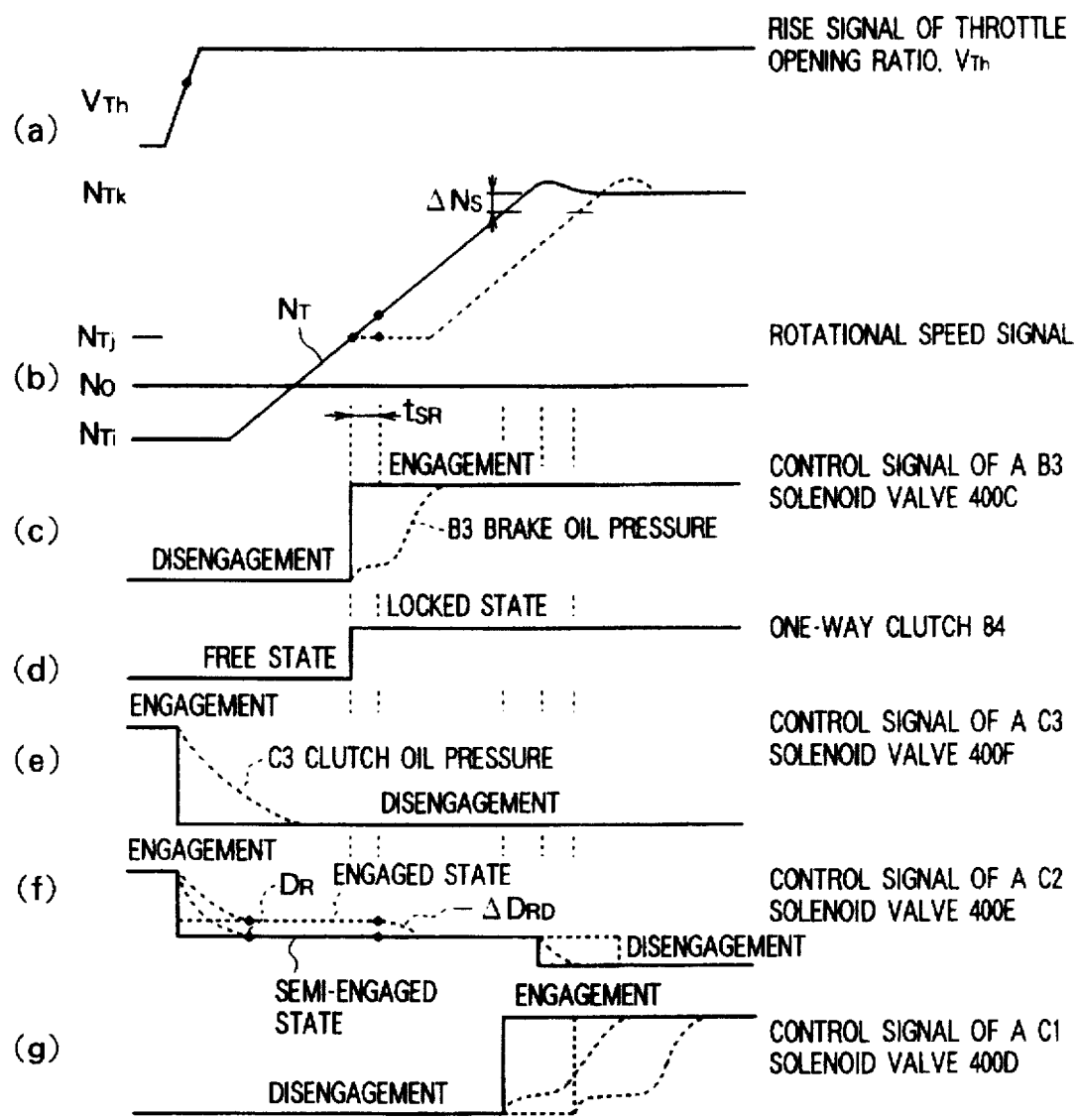
FIG. 9 is a time chart showing how the 5-2 skip shift of the embodiment of the present invention is executed.

In step S234 the oil pressure of the C2 clutch 28 on the disengagement side of the first transmission gear unit 2A is fed back and controlled (for example, by PID control) by means of the C2 solenoid valve 400E so that the aforementioned turbine rotational acceleration $dN_T$ matches with the aforementioned turbine rotational acceleration target value $dN_{To}$. On the other hand, the oil pressure of the C1 clutch 30 on the engagement side of the first transmission gear unit 2A is controlled by turning on the C1 solenoid valve 400D for causing the C1 clutch 30 to perform the engage operation, at the time the aforementioned turbine rotational acceleration $dN_T$ has reached a predetermined rotational speed which is lower than the aforementioned apparent synchronization turbine rotational speed $N_{Tk}$ by a rotation of $\Delta N_r$, as shown in FIG. 9.

While the aforementioned embodiment is an example of application to the 5-2 skip shift, the same results would be obtainable even if the present invention were applied to other forms of skip shift such as 5-3 skip shift and 4-2 skip shift. Also, although the boost pressure $P_b$ has been used for the engine torque calculation, another factor such as an engine intake air amount, a cylinder pressure, the throttle opening or the like can instead be used for the same purpose. In addition, although the correction calculation has been carried out from a map value where various kinds of correction coefficients are previously set, these correction coefficients may be calculated by an approximation equation.

Therefore, the above-described example and embodiment are to be considered as merely illustrative and not restrictive and the invention is not to be limited to the details given herein, but may be modified within the scope of the appended claims.

What is claimed is:

1. A shift control apparatus for an automatic transmission, comprising:

a first transmission gear unit having a clutch to clutch shift mechanism;

a second transmission gear unit having a clutch to one-way clutch shift mechanism, said first and second transmission gear units being operatively connected in series with each other; and control means for controlling said clutch-to-clutch shift mechanism and said clutch to one-way clutch shift mechanism in such a manner that rotational synchronization of said clutch to one-way clutch shift mechanism is caused to take place earlier than or at the same time as rotational synchronization of said clutch to clutch shift mechanism when gear shifting is effected over said first and second transmission gear units.

2. The shift control apparatus as set forth in claim 1, wherein said clutch to clutch shift mechanism comprises a plurality of normal clutches for providing a plurality of gear shift stages, and said clutch to one-way clutch shift mechanism comprises at least one normal clutch and a one-way clutch, gear shifting being effected first between said normal clutch and said one-way clutch of said clutch to one-way clutch shift mechanism and then between said normal clutches of said clutch to clutch shift mechanism.

3. The shift control apparatus as set forth in claim 1, wherein said clutch to clutch shift mechanism and said clutch to one-way clutch shift mechanism includes a plurality of pairs of rotating frictional elements which are hydraulically engaged with or disengaged from each other, said control means including electrically operated valve means for controlling hydraulic pressure applied to said frictional elements, said control means being adapted to be supplied with an electric control signal and convert it into a corresponding hydraulic pressure signal for operating said frictional elements.

4. The shift control apparatus as set forth in claim 1, further comprising skip shift judgment means which determines that said gear shifting is a skip shift, when the following conditions are all satisfied:

a) an opening degree of a throttle valve in an intake pipe of an internal combustion engine is greater than a predetermined value;

b) a manipulation speed of said throttle valve is greater than a predetermined value; and c) a degree of surplus acceleration of said internal combustion engine is less than a predetermined value.

5. The shift control apparatus as set forth in claim 4, wherein said frictional elements on engagement sides of said first and second transmission gear units are operated to perform their disengagement operations upon the skip shift judgment of said skip shift judgment means during said gear shifting.

6. The shift control apparatus as set forth in claim 3, wherein said first transmission gear unit has an input shaft operatively connected with an internal combustion engine, said control means being operable to set disengagement hydraulic pressures for said frictional elements on disengagement side of said first transmission gear unit based on a torque value of said input shaft and an inertia torque value of a rotating member of said input shaft.

7. The shift control apparatus as set forth in claim 3, wherein said second transmission gear unit has an output shaft, and wherein, in setting of disengagement hydraulic pressures for said frictional elements on disengagement side of said first transmission gear unit, completion of the rotational synchronization of said second transmission gear unit during gear shifting is judged on the basis of an apparent rotational speed of said input shaft of said first transmission gear unit upon the rotational synchronization of said first transmission gear unit which is calculated by multiplying a rotational speed of said output shaft by a gear ratio of said second transmission gear unit after it has been shifted, and also on the basis of an actual rotational speed of said input shaft, and control signals for said electrically operated valve means are learned and corrected so that a rotational acceleration of said input shaft caused by the shifting of said first transmission gear unit immediately after the rotational synchronization of said second transmission gear unit corresponds to a previously set target value of the rotational speed of said input shaft.

8. The shift control apparatus as set forth in claim 1, further comprising timer means for timing a rotational synchronization hold time after completion of said rotational synchronization of said second transmission gear unit, and wherein, in setting of disengagement hydraulic pressures for said frictional elements on disengagement side of said first transmission gear unit, when the rotational synchronization hold time from said timer means is greater than a predetermined time, the hydraulic pressures for said disengagement-side frictional elements of said first transmission gear unit are corrected in their pressure reducing direction and also the disengagement hydraulic pressure setting is learned and corrected.

9. The shift control apparatus as set forth in claim 3, further comprising a temperature sensor for sensing a temperature of hydraulic oil in said automatic transmission apparatus, said control means being operable to correct a disengagement instruction time for releasing said electrically operated valve means based on the sensed hydraulic oil temperature.

10. The shift control apparatus as set forth in claim 3, wherein the disengagement hydraulic pressure set after the lapse of a disengagement instruction time for releasing said electrically operated valve means is corrected based on a rotational speed of an engine and an oil temperature of said transmission.

11. The shift control apparatus as set forth in claim 2, wherein said one way-clutch is disposed in parallel with a brake.

12. The shift control apparatus as set forth in claim 11, wherein said brake disposed in parallel with said one-way clutch is operated immediately after completion of the rotational synchronization of said second transmission gear unit carried out through said one-way clutch.

* * * * *